US010671323B2

(12) United States Patent
Yen et al.

(10) Patent No.: US 10,671,323 B2
(45) Date of Patent: Jun. 2, 2020

(54) MEMORY SYSTEM WITH SHARED BUFFER ARCHITECTURE FOR MULTIPLE DECODERS AND METHOD OF OPERATING SUCH MEMORY SYSTEM

(71) Applicant: SK hynix Inc., Gyeonggi-do OT (KR)

(72) Inventors: Johnson Yen, Fremont, CA (US); Ngok Ying Chu, Los Altos, CA (US); Abhiram Prabhakar, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/103,576

(22) Filed: Aug. 14, 2018

(65) Prior Publication Data

US 2019/0065123 A1 Feb. 28, 2019

Related U.S. Application Data

(60) Provisional application No. 62/551,608, filed on Aug. 29, 2017.

(51) Int. Cl.
*G06F 3/06* (2006.01)
*G06F 11/10* (2006.01)

(52) U.S. Cl.
CPC .......... *G06F 3/0661* (2013.01); *G06F 3/0611* (2013.01); *G06F 3/0625* (2013.01); *G06F 3/0679* (2013.01); *G06F 11/1004* (2013.01)

(58) Field of Classification Search
CPC .... G06F 3/0661; G06F 3/0611; G06F 3/0625; G06F 3/0679; G06F 11/1004
See application file for complete search history.

(56) References Cited

U.S. PATENT DOCUMENTS

| 10,122,382 B2 | 11/2018 | Prabhakar et al. |
| 10,291,261 B2 | 5/2019 | Yen et al. |
| 2014/0068367 A1* | 3/2014 | Zhang ................ H03M 13/1142 714/752 |

(Continued)

OTHER PUBLICATIONS

Huang, Chu-Hsiang et al., "Adaptive Error Correction Coding Scheme for Computations in the Noisy Min-Sum Decoder", 2015 IEEE International Symposium on Information Theory (ISIT), pp. 1906-1910, Date of Conference in Hong Kong, China: Jun. 14-19, 2015, Date Added to IEEE Xplore: Oct. 1, 2015. (Year: 2015).*

*Primary Examiner* — Kyle Vallecillo
(74) *Attorney, Agent, or Firm* — IP & T Group LLP (57) ABSTRACT

A memory system with a shared buffer architecture for multiple decoders reduces transfer latency and power consumption. Such memory system includes a memory device to generate codewords, and a dynamic memory access (DMA) assembly to receive the generated codewords. A first decoding stage of the system comprises a checksum module and a shared memory buffer, including a memory manager and destination ports, that stores and manages codewords received from the DMA assembly. A second decoding stage of the system comprises a bit-flipping (BF) decoder and a min-sum (MS) decoder, each in communication with the shared memory buffer through a respective one of the destination ports. In managing the codewords stored in the shared memory buffer, the memory manager controls assignment including reassignment of the codewords among the destination ports.

20 Claims, 8 Drawing Sheets

(56) References Cited

U.S. PATENT DOCUMENTS

| | | | |
|---|---|---|---|
| 2014/0143628 A1* | 5/2014 | Li | H03M 13/6591 |
| | | | 714/752 |
| 2015/0026536 A1* | 1/2015 | Hubris | G06F 11/1048 |
| | | | 714/758 |
| 2016/0020783 A1* | 1/2016 | Yang | H03M 13/114 |
| | | | 360/53 |
| 2016/0134880 A1 | 5/2016 | Chengalvala et al. | |
| 2018/0375530 A1* | 12/2018 | Palangappa | H03M 13/1108 |

* cited by examiner

FIG. 8 tion. MEMORY SYSTEM WITH SHARED BUFFER ARCHITECTURE FOR MULTIPLE DECODERS AND METHOD OF OPERATING SUCH MEMORY SYSTEM

CROSS-REFERENCE TO RELATED APPLICATION(S)

This application claims the benefit of U.S. Provisional Application No. 62/551,608, filed Aug. 29, 2017, the entire contents of which are incorporated herein by reference.

BACKGROUND

1. Field

Embodiments of the present disclosure relate to a memory system with a shared buffer architecture for multiple decoders, and a method of operating such memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid-state drives (SSD).

The SSD may include flash memory components and a controller, which includes the electronics that bridge the flash memory components to the SSD input/output (I/O) interfaces. The SSD controller can include an embedded processor that can execute functional components such as firmware. The SSD functional components are typically device specific, and in most cases, can be updated.

The two main types of flash memory components are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash allows a single machine word (byte) to be written to an erased location or read independently. The NAND-type flash memory operates primarily in memory cards, USB flash drives, solid-state drives, and similar products, for general storage and transfer of data.

In an SSD controller, the error correction code (ECC) time is directly related to read latency. How to efficiently optimize the read data path and control flow is an important consideration for system performance. Usually there are several decoding schemes (e.g., one-read bit-flipping (BF) decoding, one-read min-sum (MS) hard decoding, two-read soft decoding) that can be used to process the read data. These schemes have different decoding capabilities and power consumptions. How to transfer a codeword between different decoding schemes is important for read latency.

An ECC agent plays an important role in NAND flash storage applications. In the past, a BCH code was applied to ensure data integrity for SSD applications. However, a more powerful ECC agent is needed, because the reliability of NAND flash memories has generally decreased with the implementation of high density Multi-Level Cell (MLC) and Triple-Level Cell (TLC) technology. Moreover, data transfer latency is becoming the top requirement for Enterprise SSD applications.

In this context embodiments of the present invention arise.

SUMMARY

Aspects of the present invention include memory systems. Such a memory system may comprise a memory device configured to generate codewords; a dynamic memory access (DMA) assembly in communication with the memory device to receive the generated codewords; a first decoding stage comprising a checksum module and a shared memory buffer including a memory manager, the shared memory buffer having a plurality of destination ports and configured to store codewords received from the DMA assembly; and a second decoding stage comprising a plurality of decoders including at least one bit-flipping (BF) decoder and at least one min-sum (MS) decoder, each in communication with the shared memory buffer through a respective one of the plurality of destination ports. The memory manager is configured to manage the codewords stored in the shared memory buffer and control assignment including reassignment of the codewords among the plurality of destination ports.

Further aspects of the present invention include methods, particularly methods of operating memory systems. Such a method may comprise receiving, by a first stage of the memory system, codewords from a memory device of the memory system; calculating, using a checksum module of the first stage, a checksum of each of the received codewords; applying an early selection decoding (ESD) function to each of the received codewords in the first stage; storing the codewords in a shared memory buffer of the first stage; managing the codewords using a memory manager of the first stage to control assignment including reassignment of the codewords among a plurality of destination ports in communication with a second stage of the memory system; and decoding each of the codewords at the second stage using one or both of bit-flipping (BF) decoding and min-sum (MS) decoding according to assignment by the memory manager.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Figure 1:
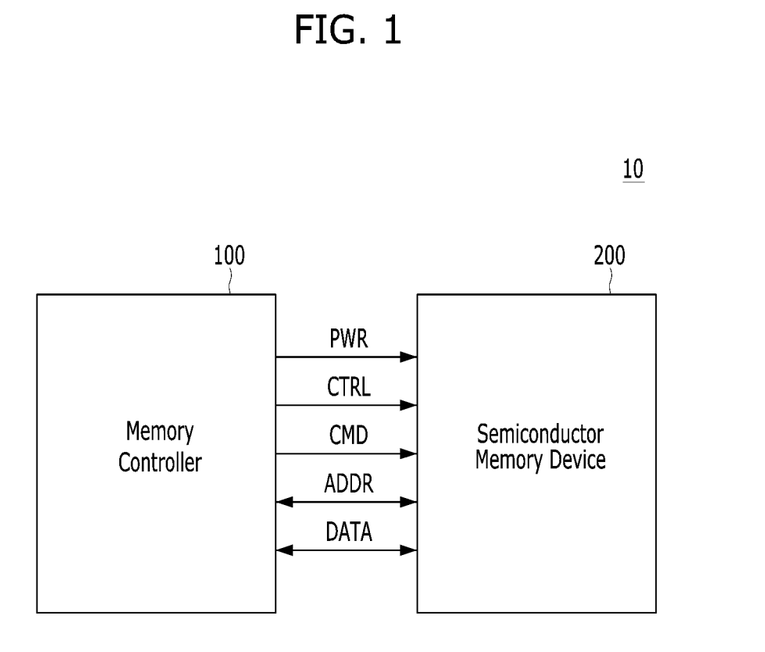
FIG. 1 is a block diagram schematically illustrating a memory system in accordance with an embodiment of the present invention.

FIG. 1 is a block diagram schematically illustrating a memory system in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid-state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
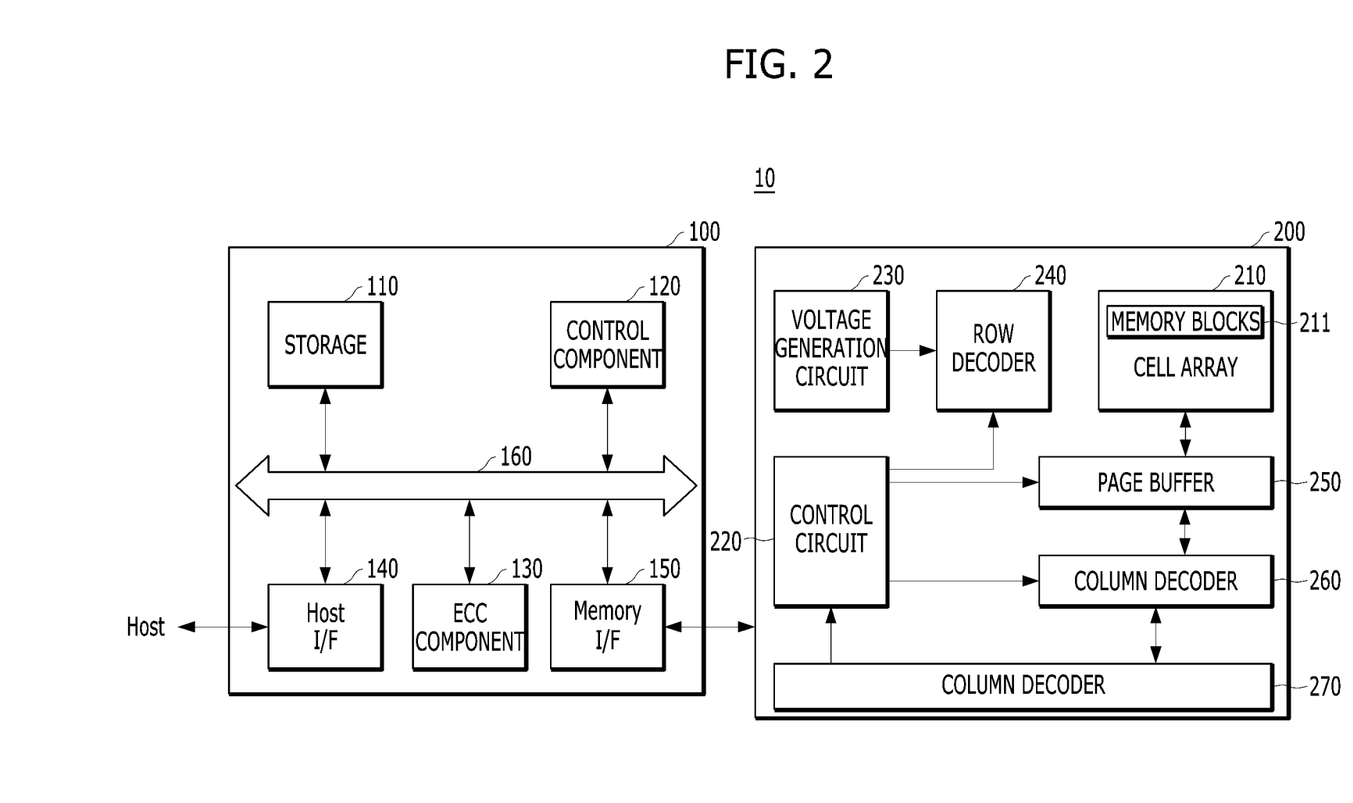
FIG. 2 is a block diagram schematically illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random-access memory (SRAM) or a dynamic random-access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on a coded modulation such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
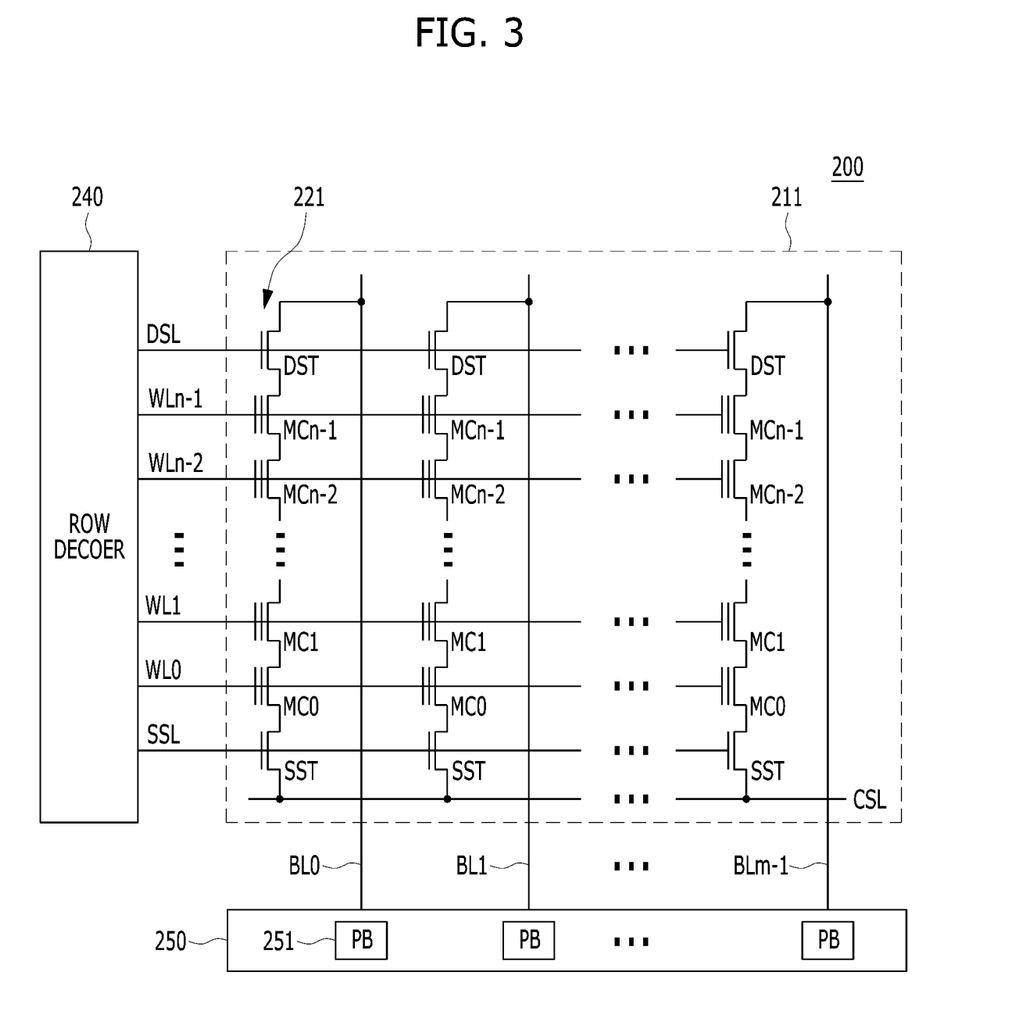
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
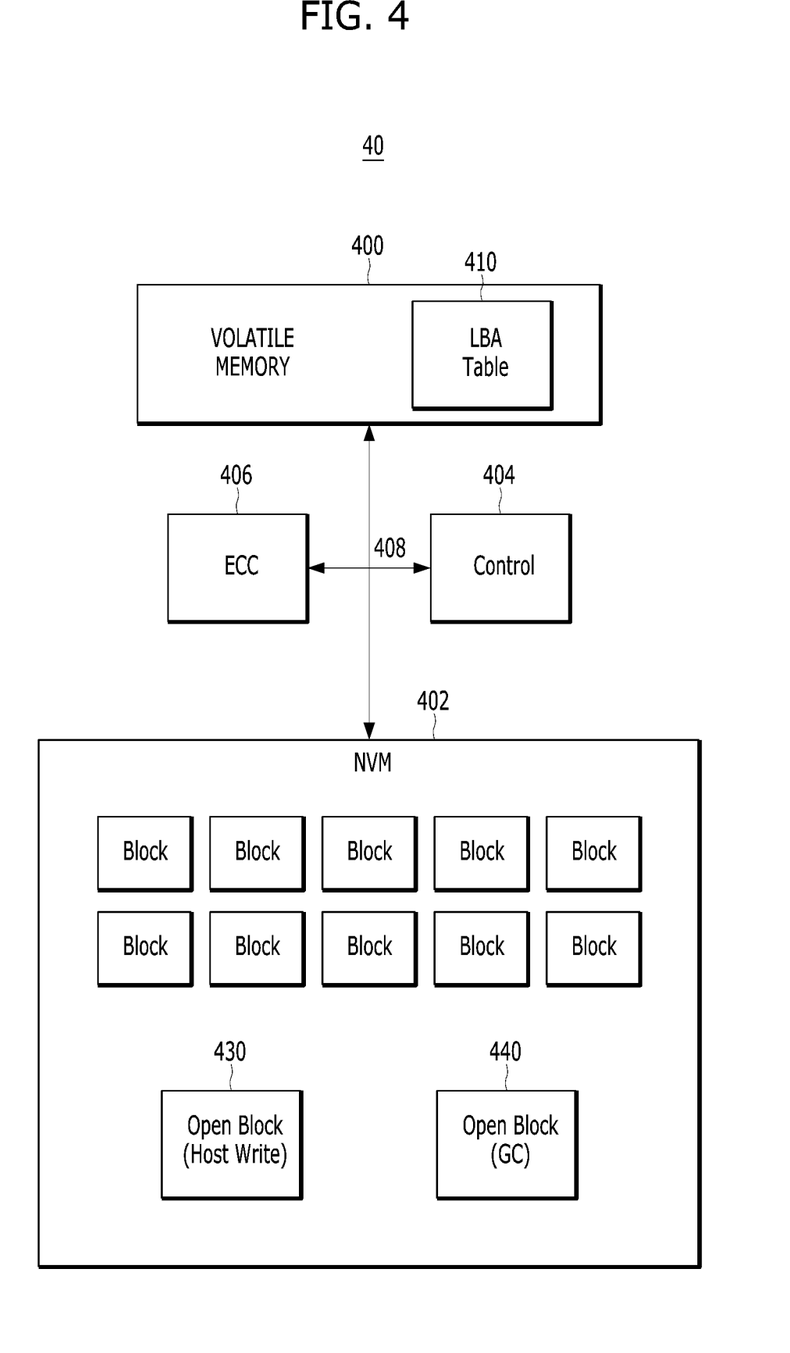
FIG. 4 is a block diagram of a memory system in accordance with an embodiment of the present invention.

Referring to FIG. 4, a general example of a memory system 40 is schematically illustrated. The memory system 40 may include a volatile memory 400 (e.g., a SRAM, DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. The memory system 40 shows a general memory system. Additional/alternative components that may be utilized with memory systems to effectuate the present invention will be understood by those of skill in the art in light of this disclosure.

Aspects of the present invention are directed to improvements in managing and controlling data (e.g., codewords) to be decoded. A management scheme and memory architecture shared among multiple decoders enables efficient assignment and reassignment of codewords among the decoders to minimize transfer latency and reduce power consumption. The efficient management memory architecture scheme, according to embodiments of the present invention, not only may reduce power consumption but may also reduce chip area. As such, embodiments of the present invention provide significant improvements in SSD applications.

In general, embodiments of the present invention include a shared memory buffer and a memory manager, which may be combined into a single module. Such individual modules or a combined module may be embodied in a memory controller, e.g., the memory controller 100 or control logic 404. Such module(s), along with decoders, may also be implemented as part of ECC component 130 and/or ECC module 406.

A number of issues are raised by current designs. The time it takes to transfer codeword data between a dynamic memory access (DMA) buffer manager and decoders is of concern. Also, the bandwidth required for data transfer from the DMA buffer manager to an MS decoder is of concern, because the codeword data may be forwarded to a BF decoder first for early selection decoding (ESD).

Data/control flow in current systems is not optimized to address these concerns in many SSD applications. Typically, a scheduler determines, based on the ESD result, the decoder type to be used and the decoding mode to process the codeword. That is, the scheduler determines whether the codeword data is to be forwarded to a BF decoder, an MS decoder, or for early termination for soft decoding. The decoding modes may include 1-bit BF decoding, 1-bit hard decoding, 2-bit Open vSwitch (OVS) soft decoding, 3-bit soft decoding.

If the ESD result indicates selection of the MS decoder, or the MS decoder is to be used after BF decoding fails, the codeword data needs to be fetched again from the DMA buffer manager and then forwarded to the MS decoder. As a result, the latency increases and additional bandwidth is also consumed.

With no efficient management system, such systems use extensive data/control flow to perform the necessary operations. The scheduler receives information from each of the BF and MS decoders, and in turn communicates back to the DMA buffer manager, which provides codeword data to each of the decoders.

Decoder design can be virtually divided into two processing stages. The first stage is the loading of data into input buffers, one for each of the decoders, calculating the ECC checksums with respective checksum modules, and initializing the decoder engines. The second stage is the decoding process with the decoder engines, which may entail multiple iterations until the checksum is satisfied or a maximum iteration number is reached.

Figure 5:
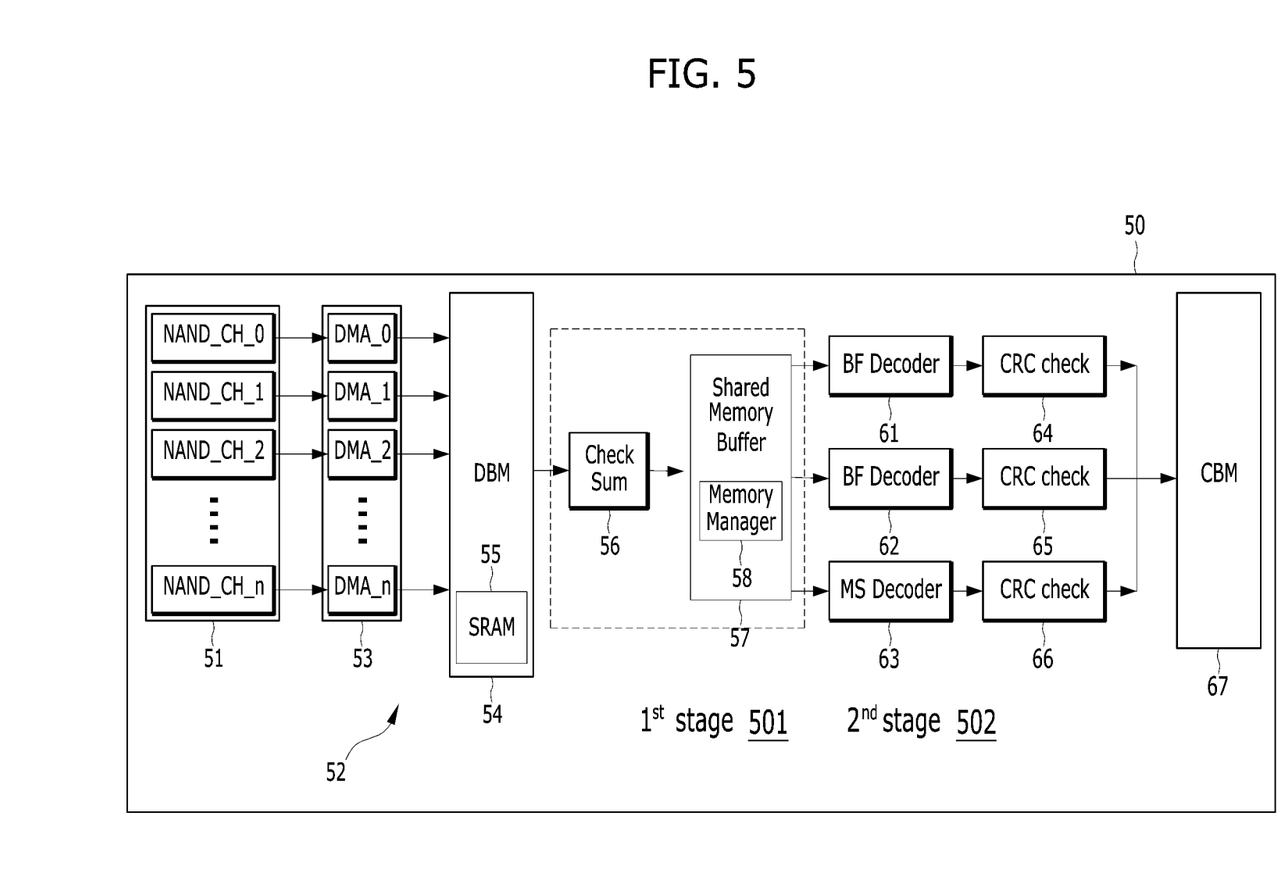
FIG. 5 is a schematic block diagram of a memory system, and in particular components related to a shared memory buffer architecture and management scheme for efficient decoding, in accordance with an embodiment of the present invention.

According to embodiments of the present invention, these two stages are separated into a $1^{st}$ (first) decoding stage and a $2^{nd}$ (second) decoding stage, as shown in FIG. 5, which is a schematic block diagram of an exemplary memory system 50, and in particular components related to storing, managing, and decoding codeword data.

Referring to FIG. 5, the memory system 50 includes a memory device 51, which may include n channels, e.g., NAND_CH_0, NAND_CH_1, ..., NAND_CH_n, where n is a positive integer that is set in accordance with characteristics, e.g., size, of the memory device 51.

The memory system 50 may further include a dynamic memory access (DMA) assembly 52, which may include n DMA channels 53 in respectively in communication with the n channels in the memory device 51, and a DMA buffer manager (DBM) 54 in communication with the DMA channels 53 to receive data including codewords therefrom. The DBM 54 may also include a static random-access memory (SRAM) 55.

The $1^{st}$ stage 501 is in communication with, and receives codewords from, the DBM 54. The $1^{st}$ stage 501 includes a checksum module 56 and a shared memory buffer 57, which may also include a memory manager 58. The shared memory buffer 57 and the memory manager 58 may be combined into a single module, as shown in FIG. 5. The shared memory buffer 57 essentially consolidates the data content of input buffers for the decoders and provides efficient management of such data through the memory manager 58.

The $2^{nd}$ stage 502 comprises the decoders. Embodiments of the present invention include at least one BF decoder and at least one MS decoder. In the embodiment illustrated in FIG. 5, there are two (2) BF decoders 61, 62 and one (1) MS decoder 63, each of which is in communication with the shared memory buffer 57 to receive codewords therefrom. The decoders 61, 62, 63 share the shared memory buffer 57 and the management functions of the memory manager 58.

In operation, codewords can be efficiently reassigned from one decoder to another decoder through the memory manager 58 by changing the destination port without re-fetching the codeword from the DBM 54.

Downstream of each of the decoders 61, 62, 63 are corresponding cyclic redundancy check (CRC) modules 64, 65, 66. That is, CRC check modules 64, 65, 66 receive the decoded output of decoders 61, 62, 63 respectively. Each CRC check module 64, 65, 66 performs a CRC check on the output of the decoder to which it is coupled. The outputs of the CRC check modules 64, 65, 66 are transmitted to a central buffer manager (CBM) 67.

Figure 6:
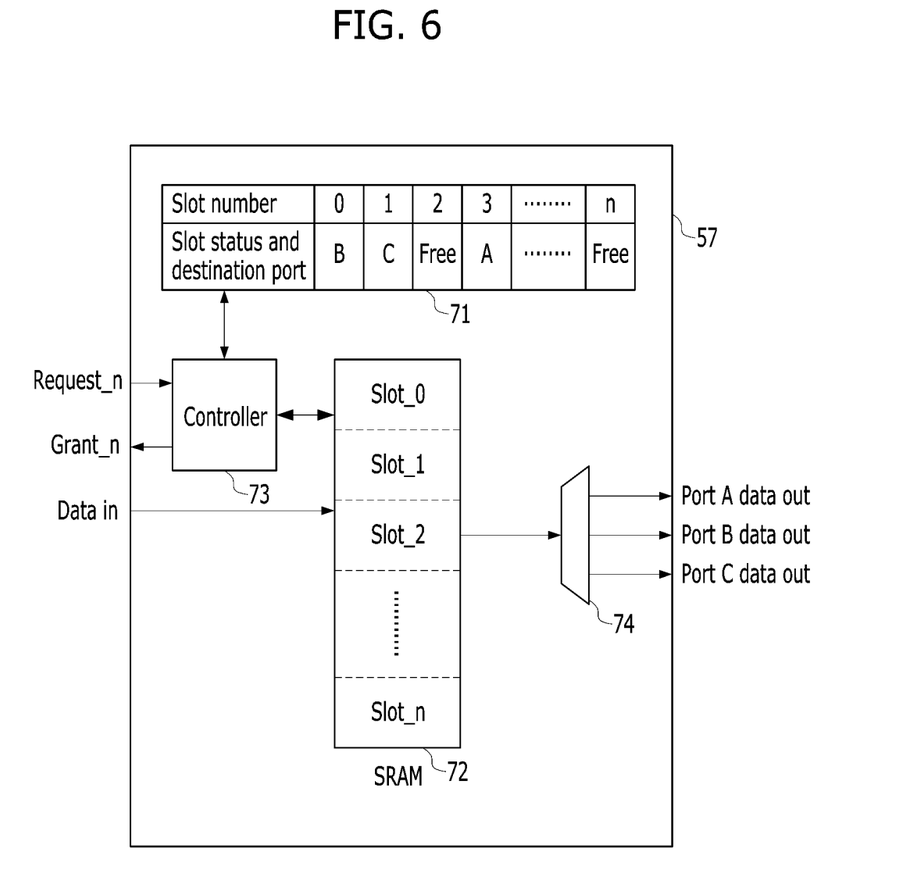
FIG. 6 is a schematic block diagram of a shared memory buffer in accordance with an embodiment of the present invention.

The shared memory buffer 57 is shown in more detail in FIG. 6. The shared memory buffer 57 includes a slot manager 71, a static random-access memory (SRAM) 72, and a controller 73 in communication with both the slot manager 71 and the SRAM 72. The SRAM 72 is partitioned into a plurality of, e.g., n+1, slots. The slots are identified as Slot_0, Slot_1, Slot_2, ..., Slot_n in FIG. 7. The slots are allocated to destination ports, e.g., Port A, Port B, Port C, via a multiplexer 74, to provide codeword data to the decoders. Port A may be in communication with the BF decoder 61, Port B may be in communication with the BF decoder 62, and Port C may be in communication with the MS decoder 63.

In operation, the controller 73 receives requests for all of the destination ports and determines whether slot access is granted, as well as provide control signals to the SRAM 72. The slot manager 71 keeps track of the status of each of the slots, maintaining up-to-date information as to whether a particular slot is free and, if not free, to which destination port it is currently allocated. The slot manager 71 works with the controller 73 to determine which slot is to be allocated to which destination port.

Returning to FIG. 5, the checksum module 56 may be a standalone component disposed immediately downstream of the DBM 54. The checksum module 56 receives data read out of the DBM 54 and calculates the checksum of each incoming codeword to determine its noise level, before sending the codeword with checksum information to the shared memory buffer 57. Then, the ESD function is performed, and that result along with checksum information is used by the memory manager 58 to determine which decoder to process the codeword.

Thus, the memory system 50 and components thereof are configured, in accordance with embodiments of the present invention, to avoid reading the same data again when the destination is reassigned to the MS decoder 63, after decoding with one of the BF decoders 61, 62 fails. More generally, a codeword can be reassigned to another decoder within the system without external transfer through the memory manager 58 by changing the destination port. As a result, read latency can be shortened. Also, since data transfer from the DBM 54 to the MS decoder 63 on reassignment becomes unnecessary, bandwidth of the DBM 54 is saved and overall power consumption is reduced.

Moreover, by consolidating input memories into one larger memory, e.g., the shared memory buffer 57, that is shared by multiple decoders and subject to an efficient memory management scheme, as in embodiments of the present invention, total memory area can be reduced.

Figure 7:
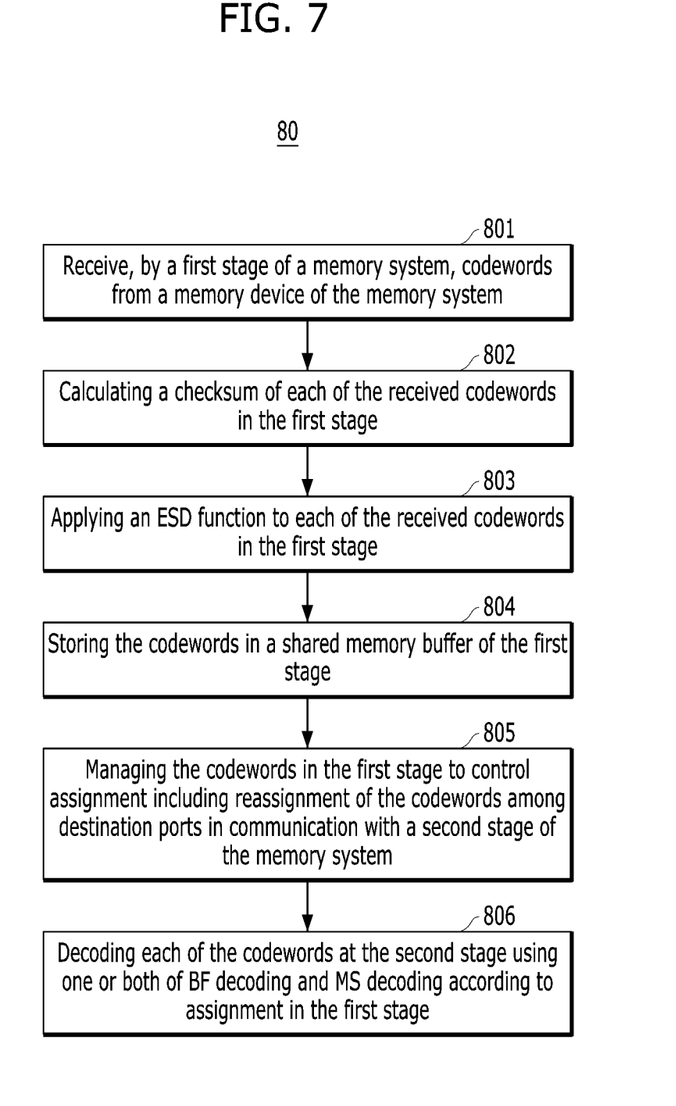
FIG. 7 is a flowchart of steps in a method of operating a memory system, or components thereof, in accordance with an embodiment of the present invention.

FIG. 7 is a flow chart 80 describing steps in processes for operating a memory system to assign and reassign, as needed, codewords among multiple decoders in accordance with an embodiment of the present invention. The steps shown in flow chart 80 are exemplary. Those skilled in the art will understand that additional or alternative steps may be performed, or that the order of the steps may be changed, in order to effectuate aspects of the present invention without departing from the inventive concepts disclosed herein. One or more of the steps of flow chart 80 may be performed by the memory controller 100, control component 120, control logic 404, ECC component 130, ECC module 406, and/or other suitable components, any of which may be implemented with hardware, software, firmware or combination thereof.

Referring to FIG. 7, in conjunction with FIGS. 5 and 6, at step 801, codewords from the memory device 51 of the memory system 50 are received by the first stage 501 of the memory system 50. The codewords may be output from channels in the memory device 51 through respective DMA channels 53 into the DBM 54. From there, the codewords are transmitted to the first stage 501.

At step 802, the checksums of the codewords are calculated by the checksum module 56, which is preferably disposed immediately downstream of the DBM 54. The checksum is calculated on each incoming codeword to determine its noise level. The checksums are also calculated to support ESD.

At step 803, the ESD function is applied to each of the received codewords. This operation is also performed in the first stage 501.

At step 804, the codewords, having had checksums calculated and the ESD function applied, are stored in the shared memory buffer 57, which consolidates the data content of input buffers for the decoders and provides efficient management of such data through the memory manager 58.

The consolidated data, e.g., the received codewords, enables efficient management of such data through the memory manager 58. At step 805, the codewords are managed to control assignment including reassignment of the codewords among a plurality of destination ports in communication with the second stage 502 of the memory system 50. Initial decoder assignment for a particular codeword may be based on the checksum calculated for that codeword, as well as the result of the ESD function performed. Such information may be used by the memory manager 58 to determine which decoder to process the codeword.

Downstream of the shared memory buffer 57 is the second stage 502 of the memory system 50. The second stage 502 comprises multiple decoders including at least one BF decoder and at least one MS decoder. In the embodiment of FIG. 5, there are two (2) BF decoders 61, 62 and one (1) MS decoder 63.

At step 806, the codewords are decoded using one or both of BF decoding and MS decoding according to assignment by the memory manager 58. The assignment includes reassignment if decoding a codeword fails with the initially assigned decoder. In that case, a different decoder is assigned to decode the codeword.

Figure 8:
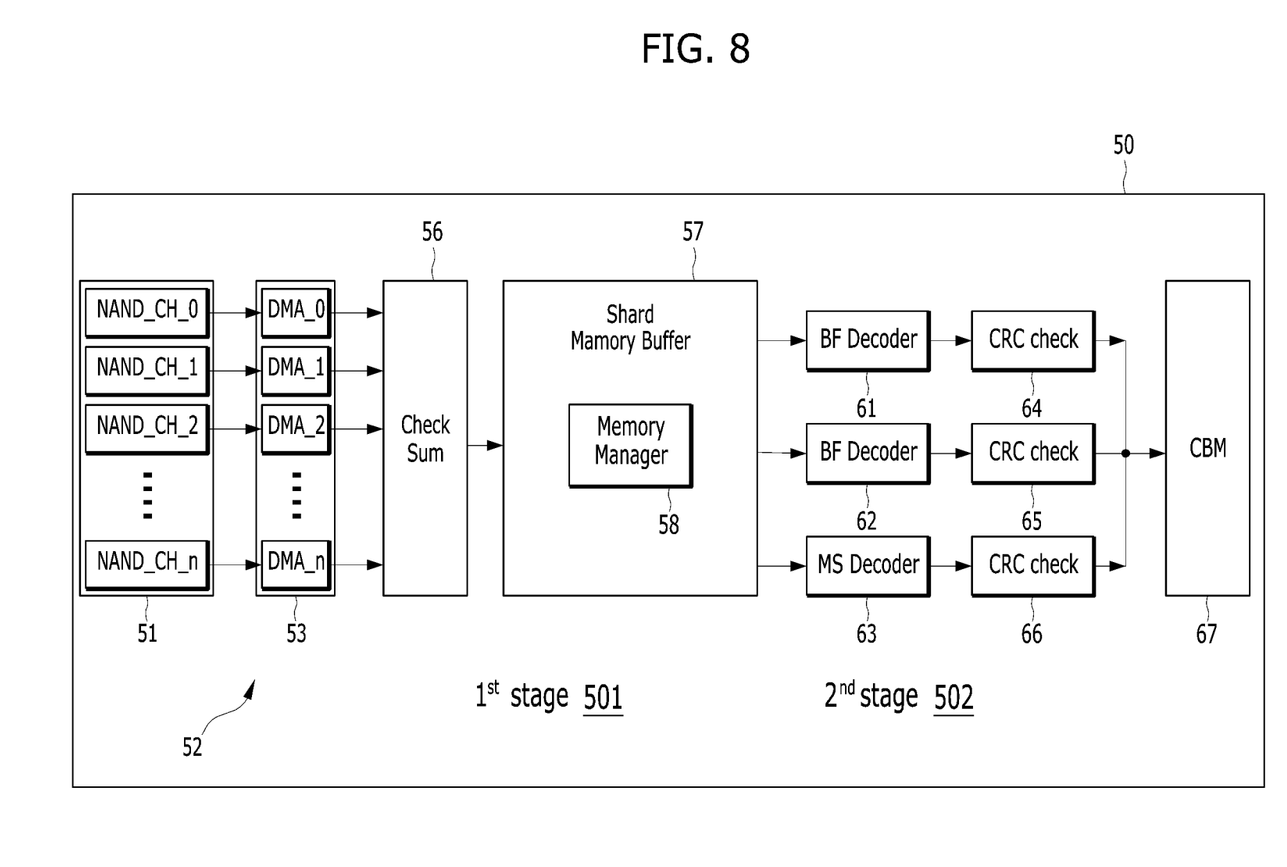
FIG. 8 is a schematic block diagram of a memory system, and in particular components related to a shared memory buffer architecture and management scheme for efficient decoding in accordance with another embodiment of the present invention.

Turning now to FIG. 8, another embodiment of the memory system 50 is illustrated. In this embodiment, there is further consolidation of certain functionality in the overall pipeline to provide further advantages, e.g., in terms of efficiency, as well as bandwidth and power reduction. In particular, the functionality of the DBM is merged with the shared memory buffer 57. In this embodiment, the dynamic memory access (DMA) assembly 52, does not include a DMA buffer manager (DBM).

Thus, the 1$^{st}$ stage 501 receives codewords directly from the DMA channels 53 of the DMA assembly 52. More particularly, the checksum module 56 is in communication with the DMA channels 53 to receive the codewords therefrom.

Other aspects and functionality of the memory system 50 of FIG. 8 are the same as those described with respect to FIG. 5.

As the foregoing demonstrates, embodiments of the present invention provide an improved memory system. Embodiments provide structure and techniques for moving codewords among multiple decoders to minimize transfer latency and power consumption. A shared memory architecture together with a memory manager avoids having to read a codeword again when the codeword is reassigned to a different decoder. Reassignment can occur within a shared memory buffer without external transfer by changing the destination port of such buffer. Bandwidth is saved and power consumption is reduced by avoiding additional external transfers from an upstream DBM to a different decoder. Moreover, the shared memory architecture advantageously reduces total memory area.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A memory system, comprising
    a memory device configured to generate codewords;
    a dynamic memory access (DMA) assembly in communication with the memory device to receive the generated codewords;
    a first decoding stage comprising a checksum module and a shared memory buffer including a memory manager, the shared memory buffer having a plurality of destination ports and configured to store codewords received from the DMA assembly; and
    a second decoding stage comprising a plurality of decoders including at least one bit-flipping (BF) decoder and at least one min-sum (MS) decoder, each in communication with the shared memory buffer through a respective one of the plurality of destination ports;
    wherein the memory manager is configured to manage the codewords stored in the shared memory buffer and control assignment including reassignment of the codewords among the plurality of destination ports.

2. The memory system of claim 1, wherein the checksum module receives the codewords from the DMA assembly before the codewords are stored in the shared buffer memory.

3. The memory system of claim 2, wherein the checksum module is configured to calculate a checksum of each received codeword to determine its noise level.

4. The memory system of claim 3, wherein the checksum module is configured to calculate the checksum of each received codeword to support application of an early selection decoding (ESD) function.

5. The memory system of claim 4, wherein, after the checksum module calculates the checksum for a codeword, among the received codewords, the memory manager determines, based at least in part on the determined noise level of the codeword and a result of the ESD function, which of the plurality of decoders to decode the codeword.

6. The memory system of claim 1, wherein the shared memory buffer further comprises:
    a random-access memory (RAM) partitioned into a plurality of slots;
    a slot manager configured to maintain a slot status of each of the plurality of slots; and
    a controller in communication with the RAM and the slot manager, the controller configured to receive requests for the plurality of destination ports and determine for each request whether slot access is granted.

7. The memory system of claim 6, wherein the controller, in cooperation with the slot manager, is configured to determine which of the plurality of slots is allocated to which of the plurality of destination ports.

8. The memory system of claim 6, wherein the slot status maintained by the slot manager includes, for each of the plurality of slots, information indicating whether a slot is free, and if not, to which of the plurality of destination ports the slot is allocated.

9. The memory system of claim 1, wherein the plurality of decoders includes two bit-flipping (BF) decoders and one min-sum (MS) decoder.

10. The memory system of claim 1, wherein the DMA assembly comprises DMA channels in communication with respective channels in the memory device and in communication with the first decoding stage.

11. The memory system of claim 1, wherein the DMA assembly comprises a DMA buffer manager in communication with the first decoding stage, and DMA channels in communication with respective channels in the memory device.

12. A method of operating a memory system, comprising:
receiving, by a first stage of the memory system, codewords from a memory device of the memory system;
calculating, using a checksum module of the first stage, a checksum of each of the received codewords;
applying an early selection decoding (ESD) function to each of the received codewords in the first stage;
storing the codewords in a shared memory buffer of the first stage;
managing the codewords using a memory manager of the first stage to control assignment including reassignment of the codewords among a plurality of destination ports in communication with a second stage of the memory system; and
decoding each of the codewords at the second stage using one or both of bit-flipping (BF) decoding and min-sum (MS) decoding according to assignment by the memory manager.

13. The method of claim 12, wherein, in the calculating operation, the checksum of each of the received codewords is calculated to determine its noise level.

14. The method of claim 13, wherein, the checksum of each of the received codewords is calculated to support the ESD function.

15. The method of claim 14, wherein the managing operation comprises determining to which of the plurality destination ports a codeword, among the received codewords, is assigned based at least in part on the determined noise level of, and a result of the ESD function applied to, the codeword.

16. The method of claim 12, further comprising maintaining a slot status of each of a plurality of slots disposed in a portion of the shared memory buffer.

17. The method of claim 16, further comprising receiving requests for the plurality of destination ports and determining, for each request, whether slot access is granted.

18. The method of claim 17, further comprising determining which of the plurality of slots is allocated to which of the plurality of destination ports.

19. The method of claim 18, wherein the slot status for each of the plurality of slots includes information indicating whether a slot is free, and if not, to which of the plurality of destination ports the slot is allocated.

20. The method of claim 12, wherein the managing operation comprises initially assigning a codeword, among the received codewords, to a first destination port associated with BF decoding, and then assigning the codeword to a second destination port associated with MS decoding.

* * * * *